O. MYRMO.
CHOKER HOOK.
APPLICATION FILED JULY 27, 1920.
1,386,894.
Patented Aug. 9, 1921.
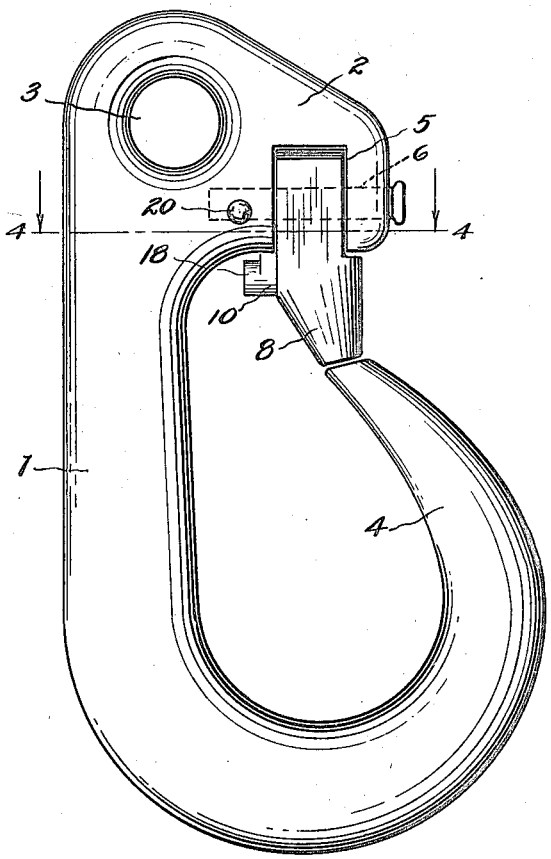
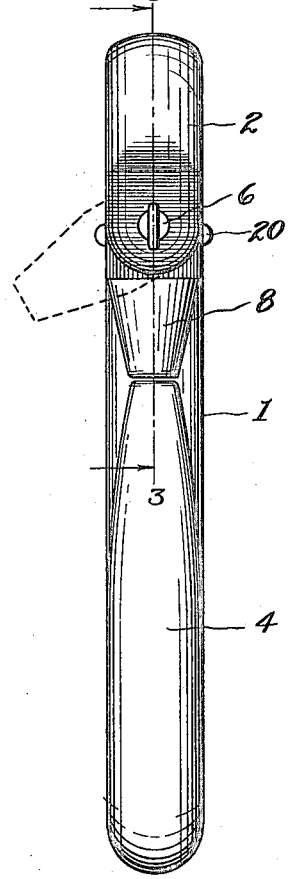
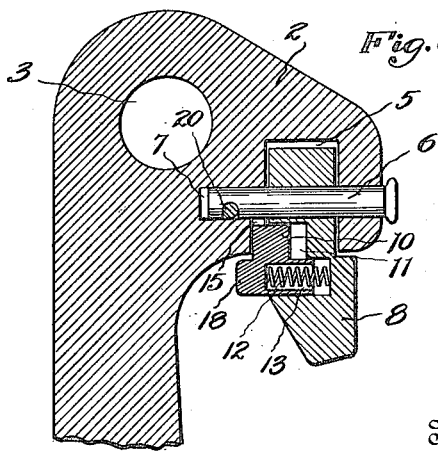
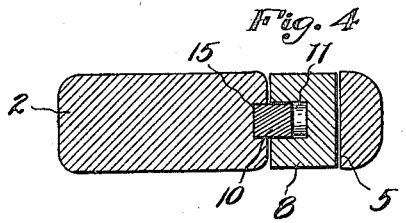
Inventor
Ole Myrmo
By his Attorney
Richard J. Cook

UNITED STATES PATENT OFFICE.

OLE MYRMO, OF HOBART, WASHINGTON.

CHOKER-HOOK.

1,386,894. Specification of Letters Patent. Patented Aug. 9, 1921.

Application filed July 27, 1920. Serial No. 399,319.

*To all whom it may concern:*

Be it known that I, OLE MYRMO, a citizen of the United States, and resident of Hobart, King county, Washington, have invented certain new and useful Improvements in Choker-Hooks, of which the following is a specification.

This invention relates to improvements in hooks, and more particularly to hooks of that type known as choker hooks and used in hauling or lifting where it is desired that the load be positively and securely held by the hook until manually released.

More specifically the invention relates to a hook wherein the mouth or opening is to be closed by a pivotally mounted, laterally movable tongue, and the object of the invention is to provide a locking mechanism of a novel character whereby the tongue may be positively held in position to close the mouth of the hook until it is manually released.

Another object resides in the construction, and combination of parts whereby assembling of the tongue and locking members is facilitated.

In accomplishing the objects of the invention, I have provided the improved details of construction, the preferred forms of which are illustrated in the accompanying drawings, wherein—

Figure 1 is a side view of a hook equipped with a tongue and locking mechanism according to the present invention.

Fig. 2 is an edge view of the open side of the same.

Fig. 3 is a sectional view of a part of the hook and the tongue and locking member, taken on the line 3—3 in Fig. 2.

Fig. 4 is a sectional view on the line 4—4 in Fig. 1.

Referring more in detail to the drawings—the hook shank 1 is provided at one end with an enlarged head 2 having an eyelet 3 therein for receiving a cable, chain or other lifting member, and is curved at its opposite end in such manner as to form a large hook 4; the end of which terminates at a spaced interval from the head 2.

Formed in the hook side of the head 2 is a transverse socket 5 and pivotally mounted therein on a pin 6 projected in a bore 7 transversely and centrally through the socket, is a tongue 8 which is adapted when in functional position, to close the hook loop, as is shown in Fig. 1, and in this position prevent the release of the hook from chains or cables that may be held therein, or which may be swung laterally as it is shown in dotted lines in Fig. 2 to permit the chain or cable to be removed from the hook.

The manner and means provided for holding the tongue in functional position consists of a latch block 10 that is slidably contained in an inwardly opening socket 11 in the inner face of the tongue. A spring 12 is located within a bore 13 in the block, and bears against the base of the socket to urge the block outwardly so that its outer edge will be moved into and yieldingly held within a notch 15 in the wall of the head socket 5, and will thereby lock the tongue against lateral movement and will hold it securely in position to close the mouth of the hook.

If it is desired to swing the tongue laterally for the purpose of removing chains or cables therefrom, or placing them in the hook, the block 10 is depressed in its socket by pressure on a button or extension 18 formed therein. This pressure will compress the spring 12 and will remove the block from the notch 15 which permits the tongue to swing laterally to open the mouth of the hook.

To lock the pin 6 in place, I have extended a key 20 transversely through the head 2 and through a notch in one side of the pin 6 which will prevent the latter from being removed without first removing the key, which would preferably be clenched at its ends and thereby secured in place.

Having thus described my invention, what I claim as new therein and desire to secure by Letters Patent is:

A hook of the character described comprising a head portion, an integral shank portion formed into a hook with its end spaced slightly below and from the head socket to form a relatively narrow mouth to the hook, said head having an eyelet therein and a transverse socket opening downwardly toward the hook end having a notch in the inner wall thereof, a tongue having one end extended into said head socket, a pin projected through that end of the tongue to pivotally mount the same in the head to swing transversely to the plane of the hook, said tongue having a socket in one side thereof in registration with said head socket wall notch, a block slidable in said tongue socket, a spring yieldingly urging said block outwardly to engage said notch to lock the tongue in closing position and a button extended from the block whereby the block may be depressed and released from said notch to permit the tongue to be swung to open position.

Signed at Seattle, Washington, this 17th day of July, 1920.

OLE MYRMO.